(12) United States Patent
Suzuki et al.

(10) Patent No.: US 7,258,217 B2
(45) Date of Patent: Aug. 21, 2007

(54) FRICTIONAL ENGAGEMENT STRUCTURE USING MULTIPLE DISKS

(75) Inventors: Yasuyuki Suzuki, Shizuoka (JP); Atsumi Muramoto, Shizuoka (JP); Kazuo Hata, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 196 days.

(21) Appl. No.: 11/147,442

(22) Filed: Jun. 8, 2005

(65) Prior Publication Data
US 2005/0274586 A1     Dec. 15, 2005

(30) Foreign Application Priority Data
Jun. 9, 2004 (JP) .............................. 2004-171611

(51) Int. Cl.
*F16D 25/0638* (2006.01)
(52) U.S. Cl. .............................. 192/85 AA; 192/109 F
(58) Field of Classification Search ...................... None
See application file for complete search history.

(56) References Cited

U.S. PATENT DOCUMENTS 3,162,063 A * 12/1964 Konrad .................. 192/85 AA
3,893,556 A * 7/1975 Lech et al. ................ 192/91 A
3,944,036 A * 3/1976 Koshelev ................ 192/109 F
6,374,687 B1 * 4/2002 Tanizawa et al. ........ 192/87.11

FOREIGN PATENT DOCUMENTS

JP        2002-213581 A       7/2002

* cited by examiner

*Primary Examiner*—Rodney H. Bonck
(74) *Attorney, Agent, or Firm*—Foley & Lardner LLP

(57) ABSTRACT

A frictional engagement structure includes a first drum arranged at the inner periphery of a transmission casing, a second drum arranged at the inner periphery of the first drum, first friction plates splined to the casing or the first drum, second friction plates splined to the second drum, the first and second friction plates being arranged alternately in the direction of an axis of rotation of the drums, a piston for pressing the first friction plates through a disk spring and ensuring coupling between the first friction plates and the second friction plates to frictionally engage the casing or the first drum with the second drum, and a spring bearing member arranged between the first friction plates and the disk spring and including a plate portion substantially parallel to the first friction plates and the outer peripheral portion arranged substantially perpendicular to the first friction plates and interposed between the disk spring and the first drum or the casing.

15 Claims, 7 Drawing Sheets

FIG.2

|   | C1 | C2 | C3 | B1 | B2 | B3 | B4 | F1 | F2 | F3 |
|---|---|---|---|---|---|---|---|---|---|---|
| 1st | (◯)*** | (◯)* |   |   | ◯ | ◯* | ● | △ | △ | △ |
| 2nd |   |   | ● |   | ◯ |   | ● |   | △ | △ |
| 3rd |   | ● | ● |   | ◯ |   | (◯) |   | △ |   |
| 4th | ● | ● | ● |   |   |   | (◯) |   |   |   |
| 5th | ● | ● |   |   | ● |   | (◯) |   |   |   |
| Rev |   | ◯ |   | ● | ◯ |   |   | △ | △ |   |

● : ENGAGED

◯ : ENGAGED, BUT NOT INVOLVED IN POWER TRANSFER ON THE DRIVE SIDE

◯* : IMMEDIATELY RELEASED AFTER 1-2 UPSHIFT, OR IMMEDIATELY ENGAGED AFTER DOWNSHIFT TO 1ST SPEED

△ : INVOLVED IN TORQUE TRANSFER DURING POWER ON (◯) : FRICTION ELEMENT(S) SUPPLIED WITH HYDRAULIC PRESSURE, BUT HAVING NO OPERATION INFLUENCING OUTPUT (◯)* : ENGAGED ONLY UPON PREDETERMINED VEHICLE VELOCITY OR LESS (COUNTERMEASURES AGAINST IDLE BALANCE AND SELECT LAG)

(◯)*** : ENGAGED DURING GIVEN PERIOD ONLY UPON SELECT WITH PREDETERMINED THROTTLE OPENING OR LESS

FRICTIONAL ENGAGEMENT STRUCTURE USING MULTIPLE DISKS

BACKGROUND OF THE INVENTION

The present invention relates to a multiple disk clutch in a frictional engagement structure using multiple disks, and more particularly, to a cushioning disk spring and spring bearing member arranged between a clutch plate and a piston.

With a multiple disk clutch in the related-art frictional engagement structure using multiple disks, driven plates and drive plates are splined to respective drums that produce relative rotation. When pressed by a piston, the driven plates and drive plates are frictionally engaged with each other to cause unitary rotation of the two drums. With such a frictional engagement structure, a cushioning disk spring is arranged between the piston and the drive plates so as to prevent abrupt change in the engagement force of the driven plates and drive plates, achieving smooth engagement of the clutch. In this connection, refer to Japanese document P2002-213581A.

With the above multiple disk clutch, however, the disk spring is typically formed of steel that is a material harder than that of the drums. Thus, during non-engagement of the clutch, the free disk spring rotates with respect to the outer-periphery-side drum due to rotational variations, and makes slide contact with the inner peripheral wall of the drum, causing wear of the drum. Such wear can be prevented by hardening the drum through heat treatment, which causes, however, not only an increase in the number of working processes and in manufacturing cost, but also difficult achievement of sufficient strength even through execution of heat treatment, which is a case that the material is aluminum, for example. Alternatively, drum wear can be prevented by providing claws to the disk spring for its engagement and fixing to the drum. With this alternative, however, the claws make contact with splines of the drum to transfer thereto torque in the direction of rotation, leading to possibility of causing damage to the splines.

SUMMARY OF THE INVENTION

It is, therefore, an object of the present invention to provide a frictional engagement structure using multiple disks, which allows prevention of contact between the drum and the disk spring to restrain damage to the drum.

Generally, the present invention provides a frictional engagement structure using multiple disks, the frictional engagement structure being adapted to an automatic transmission including a casing, wherein the frictional engagement structure comprises: a first drum arranged at an inner periphery of the casing; a second drum arranged at an inner periphery of the first drum; a plurality of first friction plates splined to one of the casing and the first drum; a plurality of second friction plates splined to the second drum, the first and second friction plates being arranged alternately in a direction of an axis of rotation of the first and second drums; a piston that presses the first friction plates through a disk spring, the piston ensuring coupling between the first friction plates and the second friction plates to frictionally engage one of the casing and the first drum with the second drum; and a spring bearing member arranged between the first friction plates and the disk spring, the spring bearing member comprising a plate portion substantially parallel to the first friction plates and an outer peripheral portion arranged substantially perpendicular to the first friction plates and interposed between the disk spring and one of the first drum and the casing.

BRIEF DESCRIPTION OF THE DRAWINGS

The other objects and features of the present invention will become apparent from the following description with reference to the accompanying drawings, wherein:

FIG. 2 is a table showing engagement operation of the automatic transmission;

DETAILED DESCRIPTION OF THE INVENTION

Figure 1:
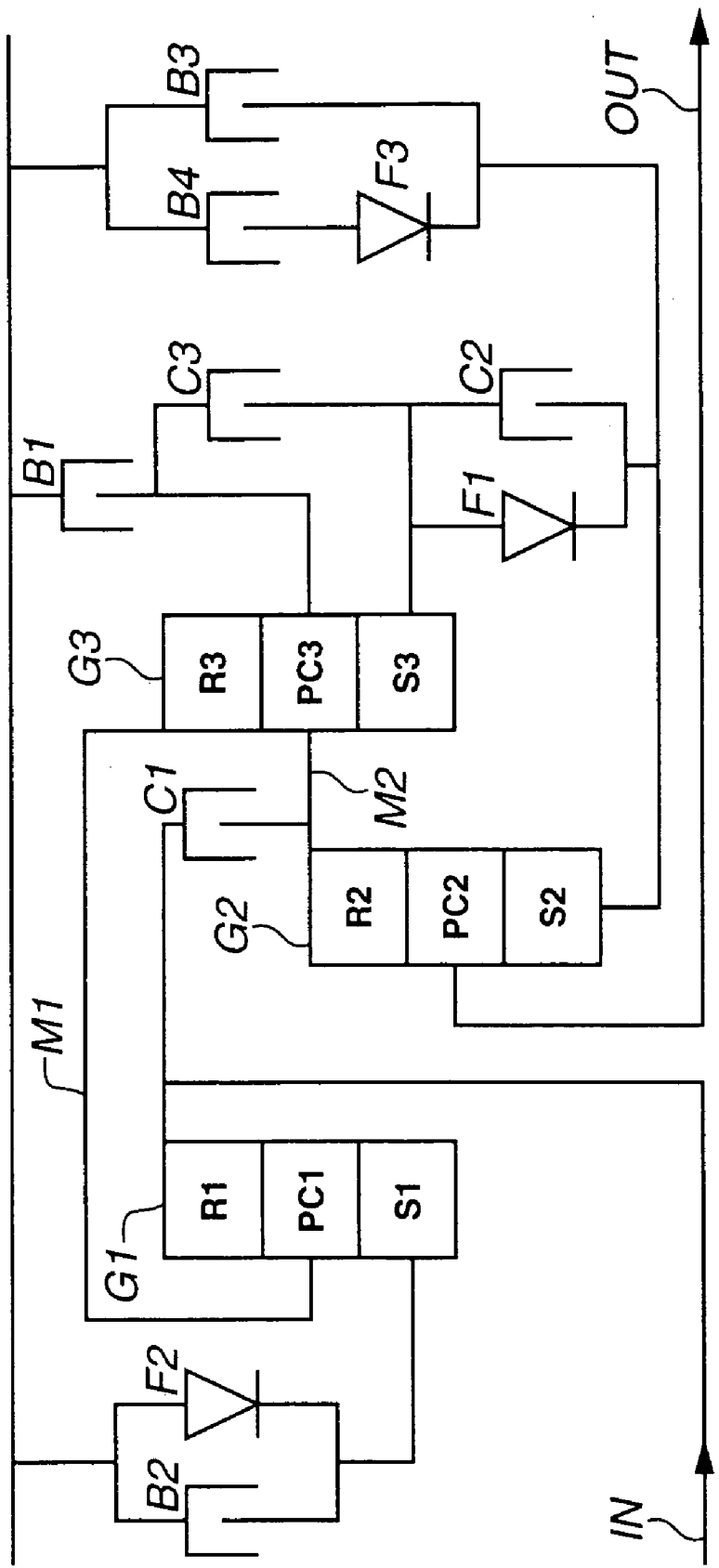
FIG. 1 is a schematic block diagram showing an automatic transmission to which a frictional engagement structure using multiple disks according to the present invention is applied.

Referring to the drawings, the best mode for carrying out the present invention will be described in accordance with the first and second embodiments.

Referring to FIGS. 1-4, there is shown a first embodiment of the frictional engagement structure according to the present invention. Referring to FIG. 1, the automatic transmission comprises planetary-gear sets G1, G2, G3, coupling members M1, M2, clutches C1, C2, C3, brakes B1, B2, B3, B4, one-way clutches F1, F2, F3, an input shaft IN, and an output shaft OUT.

The first, second, and third planetary-gear sets G1, G2, G3 include a single-pinion planetary-gear set. The first planetary-gear set Gi comprises a first sun gear S1, a first ring gear R1, and a first carrier PC1 for supporting a pinion meshed with the gears S1, R1. The second planetary-gear set G2 comprises a second sun gear S2, a second ring gear R2, and a second carrier PC2 for supporting a pinion meshed with the gears S2, R2. The third planetary-gear set G3 comprises a third sun gear S3, a third ring gear R3, and a third carrier PC3 for supporting a pinion meshed with the gears S3, R3.

The first and second coupling members M1, M2 serve to integrally couple the first carrier PC1 to the third ring gear R3, and the second ring gear R2 to the third carrier PC3, respectively.

The first clutch C1 serves to selectively engage and disengage the first ring gear R1 and the second ring gear R2, whereas the second clutch C2 serves to selectively engage and disengage the second sun gear S2 and the third sun gear S3. A first one-way clutch F1 is arranged in parallel to the second clutch C2. The third clutch C3 serves to selectively engage and disengage the third carrier PC3 and the third sun gear S3.

The first brake B1 serves to selectively stop rotation of the second coupling member M2, whereas the second brake B2 serves to selectively stop rotation of the first sun gear S1. A second one-way clutch F2 is arranged in parallel to the second brake B2. The third brake B3 serves to selectively stop rotation of the second sun gear S2. A fourth brake B4 and a third one-way clutch F3 are arranged in parallel to the third brake B3. Note that the fourth brake B4 and the third one-way clutch F3 are disposed in series.

Connected to the clutches C1, C2 and the brakes B1, B2, B3, B4 are a change-speed hydraulic control unit (of the hydraulic control type, electronic control type, or hydraulic/electronic control type), not shown, for generating the engagement pressure and release pressure at each speed.

The input shaft IN is coupled to the first ring gear R1 to receive engine torque through a torque converter, not shown. The output shaft OUT is coupled to the second carrier PC2 to transmit output torque to the driving wheels through a final gear, not shown, and the like.

Referring to FIG. 2, engagement operation of the automatic transmission will be described. In FIG. 2, ● designates a state that the friction engagement element(s) is engaged, ○ designates a state that the friction engagement element(s) is engaged, but not involved in power transfer on the drive side, ○* designates a state that the friction engagement element(s) is immediately released after 1-2 upshift, or immediately engaged after downshift to $1^{st}$ speed, Δ designates a state that the friction engagement element(s) is involved in torque transfer during power on, (○) designates a state that the friction engagement element(s) is supplied with hydraulic pressure, but has no operation influencing output, (○)* designates a state that the friction engagement element(s) is engaged only upon a predetermined vehicle velocity or less for countermeasures against oil-mount balance upon idle and time lag upon selection, and (○)*** designates a state that the friction engagement element(s) is engaged during a given time period only upon selection with a predetermined throttle opening or less.

Figure 3:
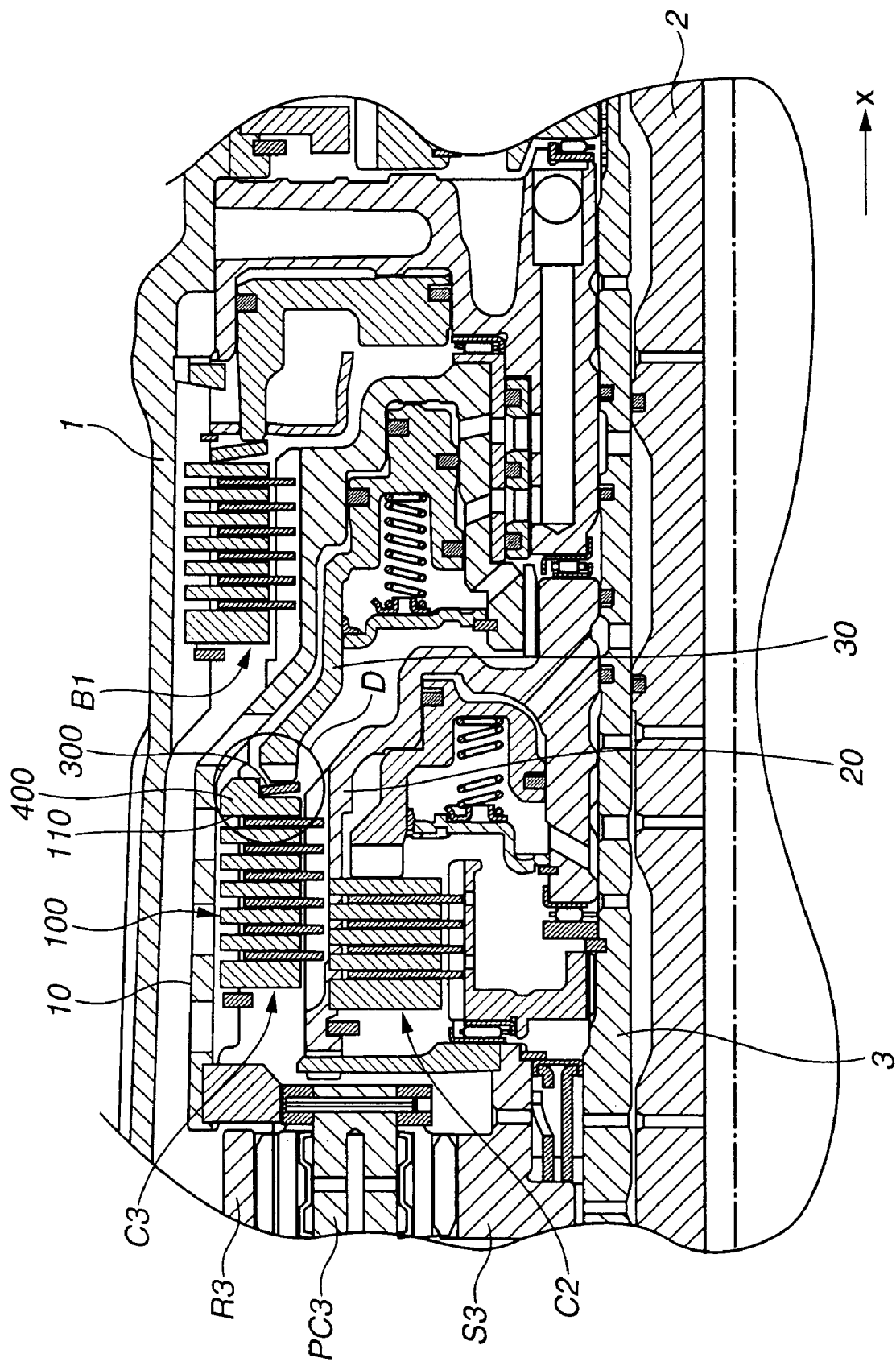
FIG. 3 is a fragmentary sectional view showing a first embodiment of the frictional engagement structure.

Referring to FIG. 3, the third clutch C3 of the frictional engagement structure and its surroundings will be described. The friction engagement elements close to the third clutch C3 includes second clutch C2 and first brake B1.

The third clutch C3 is connected to the third carrier PC3 and the first brake B1 through a first drum 10, and to the second clutch C2 and the third sun gear S3 through a second drum 20 arranged interior of the first drum 10. The second clutch C2 is arranged interior of the third clutch C3, and is connected to the second sun gear S2 (not shown in FIG. 3) through a coupling member 3. The first brake B1 is connected to a transmission casing 1 to serve as a brake for stopping rotation of the first drum 10 through friction.

The third clutch C3 comprises driven plates (first friction plates) 100 and drive plates (second friction plates) 200 arranged alternately, wherein the driven plates 100 are splined to the first drum 10 on the outer-periphery side, and the drive plates 200 are splined to the second drum 20 on the inner-periphery side. Note that the driven plate can be referred to as separator plate, and the drive plate can be referred to as friction plate.

A third piston 30 is arranged in the x-axis positive direction of the third clutch C3 to press the third clutch C3 in the x-axis negative direction through a disk spring 300. Through frictional engagement of the driven plates 100 and the drive plates 200 produced by pressing of the third piston 30, the third clutch C3 ensures torque transfer between the first and second drums 10, 20.

A spring bearing member 400 is provided to a first driven plate 110 of the driven plates 100 situated at an x-axis positive direction end of the third clutch C3 and on the side closest to the third piston 30 so as to make contact with the disk spring 300. In the first embodiment, the spring bearing member 400 and the first driven plate 110 are integrated with each other. The third clutch C3 is pressed to the third piston 30 through the disk spring 300 and the spring bearing member 400 integrated with the first driven plate 110.

Figure 4:
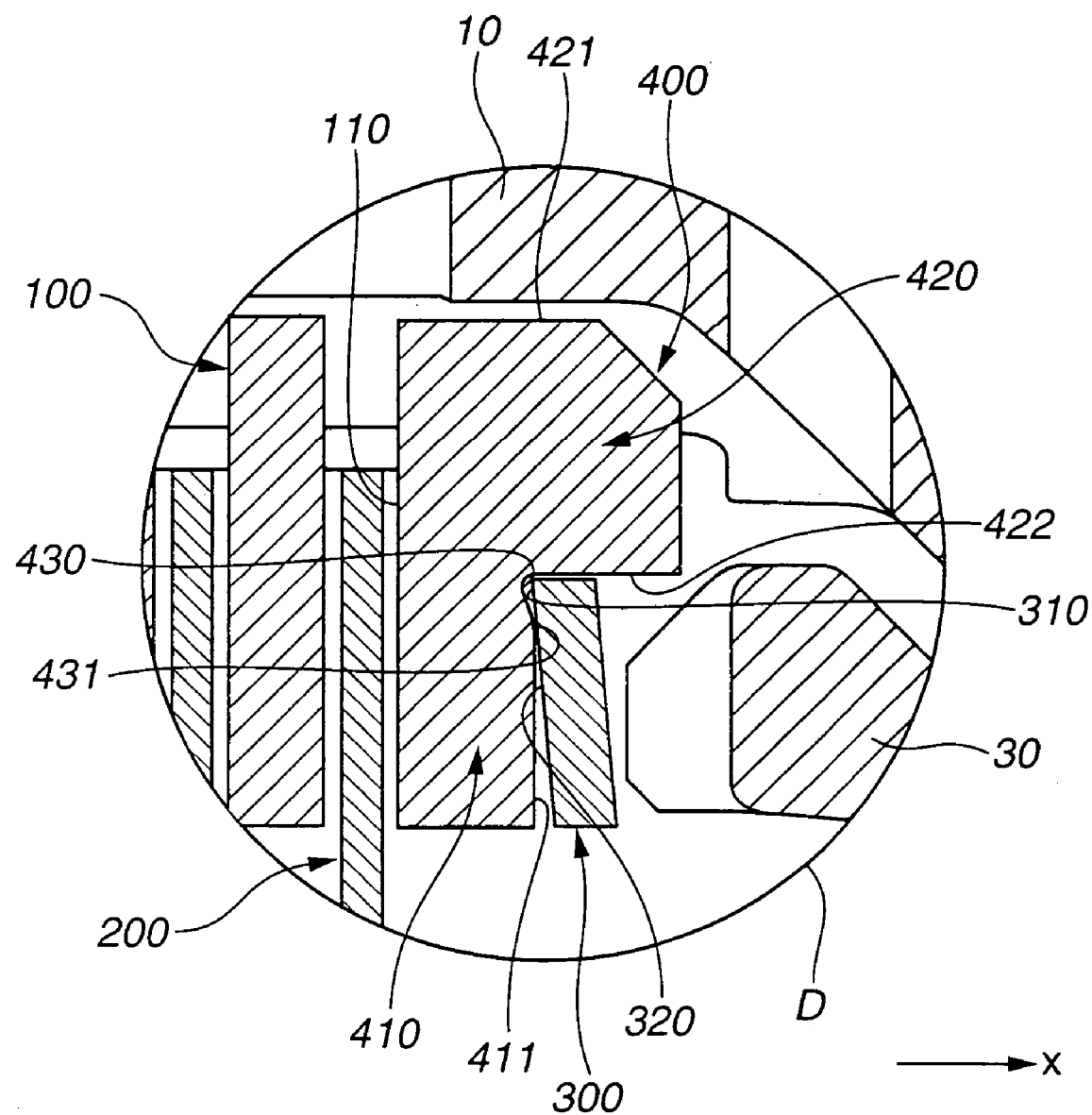
FIG. 4 is an enlarged sectional view showing a spring bearing member in the first embodiment.

Referring to FIG. 4, the spring bearing member 400 and its surroundings will be described. FIG. 4 is a detailed view of an area D in FIG. 3. The spring bearing member 400 comprises an axial bearing portion (plate portion) 410 substantially parallel to the driven plates 100, and a radial bearing portion (outer peripheral portion) 420 arranged substantially perpendicular to the driven plates 100 and interposed between the disk spring 300 and the first drum 10.

The axial bearing portion 410 has an x-axis positive direction surface 411 making in contact with the disk spring 300, whereas the radial bearing portion 420 has an outer peripheral surface 421 splined to the first drum 10. An inner peripheral surface 422 of the radial bearing portion 420 has a diameter larger than the outer diameter of the disk spring 300 so as not to reverse the relationship therebetween even if the outer diameter of the disk spring 300 increases due to elastic deformation caused by pressing.

A recess 430 denting in the x-axis negative direction is provided at a corner where the inner peripheral surface 422 meets the x-axis positive direction surface 411. As a result, a corner 310 as an outer-diameter end and x-axis negative direction end of the disk spring 300 enters the recess 430, so that the disk spring 300 and the spring bearing member 400 make contact with each other in the x-axis direction at a contact surface 320 as an x-axis negative direction end of the disk spring 300 and a recess start portion 431 of the x-axis positive surface 411.

Next, operation of the disk spring 300 when pressed by the third piston 30 will be described. When pressed by the third piston 30, the disk spring 300 makes contact with the recess start portion 431 of the spring bearing member 400 at the contact surface 320, so that a pressing force of the third piston 30 is transmitted to the spring bearing member 400.

Then, a pressing force of the third piston 30 is transmitted to the spring bearing member 400 with the recess start portion 431 of the x-axis positive direction surface 411 as a fulcrum. Thus, even if the disk spring 300 becomes elastically deformed by pressing, the fulcrum of a pressing force is situated on the x-axis positive direction surface 411, i.e. it is fixed with respect to the x axis. As a result, since the fulcrum of a pressing force does not move with respect to the x axis even upon pressing of the third piston 30, the amount of stroke of the disk spring 300 does not vary by a factor other than elastic deformation.

The inner peripheral surface 422 of the radial bearing portion 420 has a diameter larger than the outer diameter of the disk spring 300. Since the relationship between the two is not reversed by only a deformation amount due to elastic deformation, a load function provided to the disk spring 300 may not be impaired. Moreover, even if the disk spring 300 makes contact with the inner peripheral surface 422 by rotation of the members, the disk spring 300 does not make contact with the first drum 10 due to the existence of the radial bearing portion 420.

Operation of the related art and that of the first embodiment will be compared. In the related-art frictional engagement structure, the cushioning disk spring is arranged between the piston and the drive plates so as to prevent abrupt change in engagement force of the driven plates and drive plates, thus achieving smooth engagement of the clutch. However, during non-engagement of the clutch, the free disk spring rotates with respect to the outer-peripheryside drum due to rotational variations, and makes slide contact with the inner peripheral wall of the drum, causing wear of the drum.

Such wear can be prevented by hardening the drum through heat treatment, which causes, however, not only an increase in the number of working processes and in manufacturing cost, but also difficult achievement of sufficient strength even through execution of heat treatment, which is a case that the material is aluminum, for example. Alternatively, drum wear can be prevented by providing claws to the disk spring for its engagement and fixing to the drum. With this alternative, however, the claws make contact with splines of the drum to transfer thereto torque in the direction of rotation, leading to possibility of causing damage to the splines.

On the other hand, in the first embodiment, there arranges the spring bearing member 400 integrated with the first driven plate 110. The spring bearing member 400 comprises axial bearing portion (plate portion) 410 substantially parallel to the driven plates 100, and radial bearing portion (outer peripheral portion) 420 arranged substantially perpendicular to the driven plates 100 and interposed between the disk spring 300 and the first drum 10. With this, contact can be avoided between the external first drum 10 and the disk spring 300, resulting in prevention of wear of the first drum 10 due to slide contact with the disk spring 300.

Further, the axial bearing portion 410 has x-axis positive direction surface 411 making in contact with the disk spring 300, whereas the radial bearing portion 420 has outer peripheral surface 421 splined to the first drum 10. With this, larger engagement area can be set between the spring bearing member 400 and the first drum 10, reducing a torque transfer amount per unit area between the spring bearing member 400 and the first drum 10, resulting not only in restraint of a load which the spring bearing member 400 provides to the first drum 10, but also in stable fixing of the spring bearing member 400.

Still further, the recess 430 denting in the x-axis negative direction is provided at a corner where the inner peripheral surface 422 meets the x-axis positive direction surface 411. With this, the disk spring 300 and the spring bearing member 400 make contact with each other at the contact surface 320 and the recess start portion 431. Thus, even if the disk spring 300 becomes elastically deformed by pressing, the fulcrum of a pressing force can be situated on the x-axis positive direction surface 411, i.e. it can be fixed with respect to the x axis. As a result, the fulcrum of a pressing force does not move with respect to the x axis even upon pressing of the third piston 30, and the corner 310 of the disk spring 300 enters the recess 30, allowing achievement of the stable stroke characteristics of the disk spring 300 while avoiding unstable contact between the corner 310 and the spring bearing member 400 and contact wear of the spring bearing member 400 and the disk spring 300.

Furthermore, the spring bearing member 400 and the first driven plate 110 are integrated with each other, allowing easier manufacturing thereof by sintering or the like.

Figure 5:
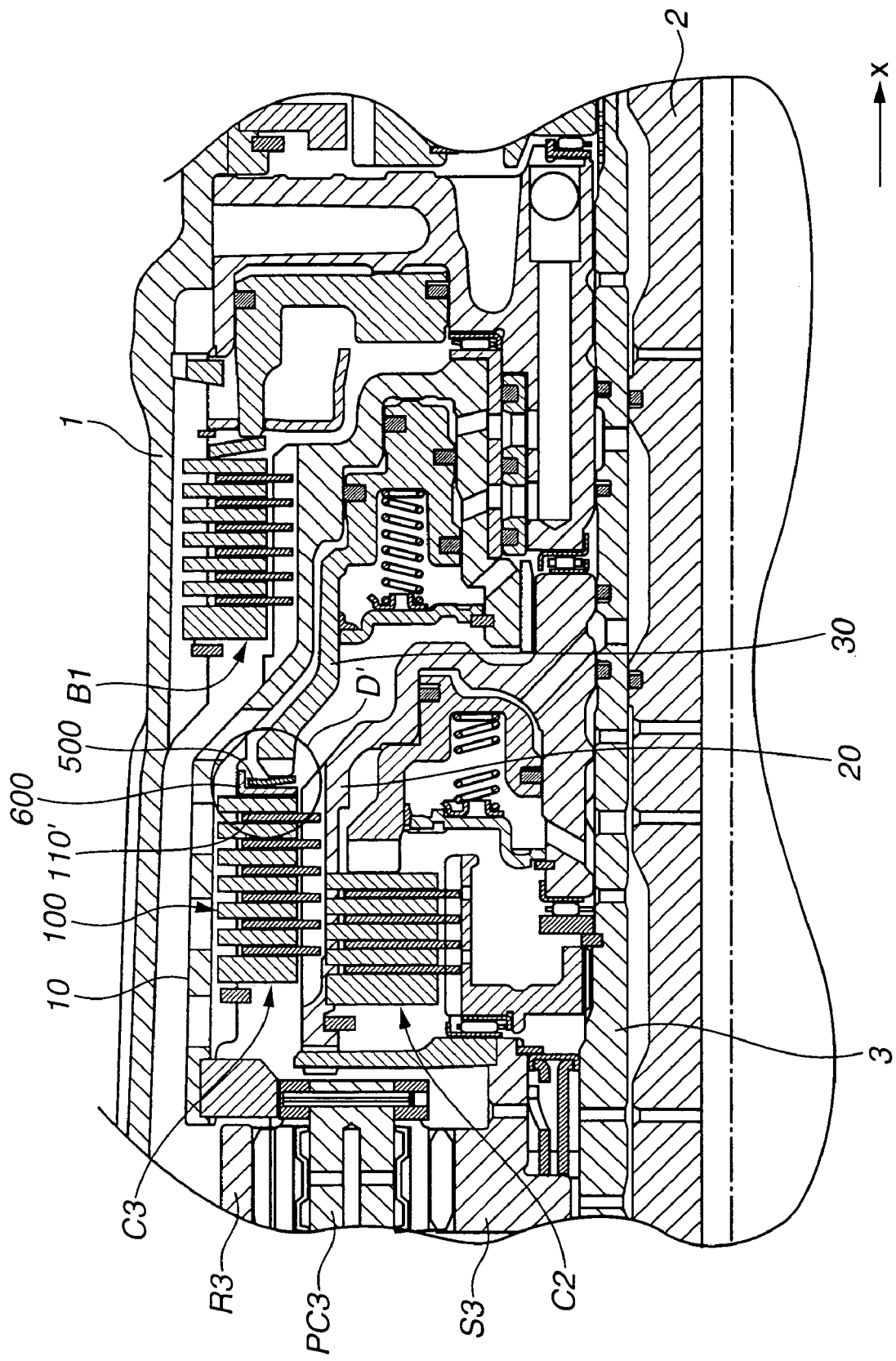
FIG. 5 is a view similar to FIG. 3, showing a second embodiment of the present invention.
Figure 6:
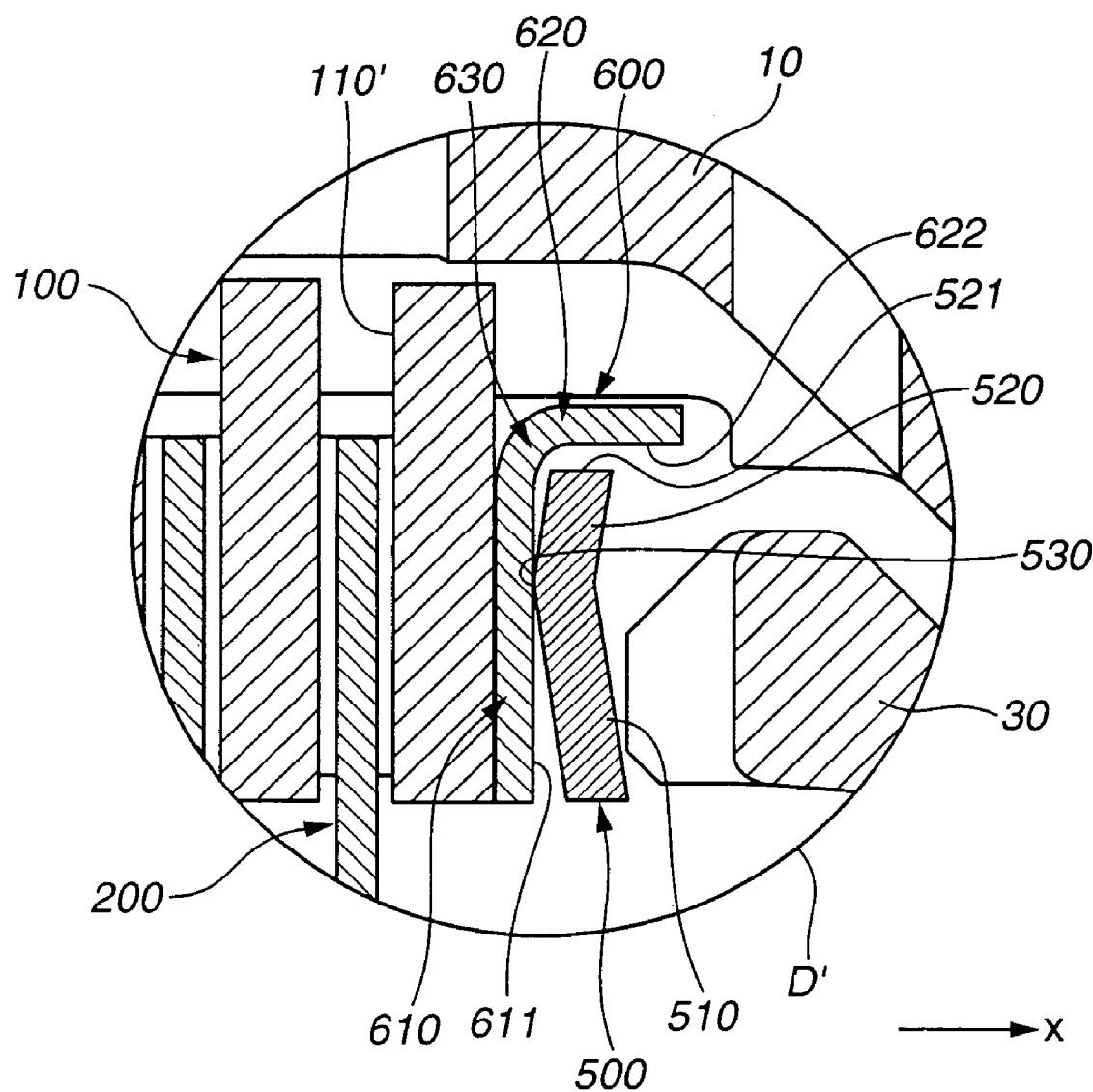
FIG. 6 is a view similar to FIG. 4, showing a spring bearing member in the second embodiment.

Referring to FIGS. 5 and 6, there is shown second embodiment of the present invention that is the same as the first embodiment in fundamental structure. The second embodiment differs from the first embodiment in that in the first embodiment, the disk spring 300 is engaged to the spring bearing member 400 integrated with the first driven plate 110, whereas in the second embodiment, it is adopted an angle disk spring 500 different to the disk spring 300, and the disk spring 500 is engaged to a spring bearing member 600 which is a member separate and distinct from the first driven plates 110.

Referring to FIG. 5, the third clutch C3 of the frictional engagement structure and its surroundings in the second embodiment will be described. In the same way as in the first embodiment, the friction engagement elements close to the third clutch C3 includes second clutch C2 and first brake B1. The friction engagement elements in the second embodiment are the same in structure and operation as those in the first embodiment.

In the same way as in the first embodiment, the third piston 30 is arranged in the x-axis positive direction of the third clutch C3 to press the third clutch C3 in the x-axis negative direction through the disk spring 500. Through frictional engagement of the driven plates 100 and the drive plates 200 produced by pressing of the third piston 30, the third clutch. C3 ensures torque transfer between the first and second drums 10, 20.

The spring bearing member 600 is provided to a first driven plate 110' of the driven plates 100 situated at an x-axis positive direction end of the third clutch C3 and on the side closest to the third piston 30 so as to make contact with the disk spring 500. As distinct from the first embodiment, in the second embodiment, the spring bearing member 600 is a member separate and distinct from the first driven plate 110'. The third clutch C3 is pressed to the third piston 30 through the disk spring 500 and the spring bearing member 600 which is a member separate and distinct from the first driven plate 110'.

Referring to FIG. 6, the spring bearing member 600 and its surroundings will be described. FIG. 6 is a detailed view of an area D' in FIG. 5. In the first embodiment, the recess 430 is provided to the spring bearing member 400 at a corner defined by the axial bearing portion 410 and the radial bearing portion 420.

Likewise, in the second embodiment, the spring bearing member 600 comprises an axial bearing portion (plate portion) 610 substantially parallel to the first driven plate 110', and a radial bearing portion (outer peripheral portion) 620 arranged substantially perpendicular to the driven plates 100 and interposed between the disk spring 500 and the first drum 10. However, as distinct from the first embodiment, the axial bearing portion 610 and the radial bearing portion 620 are continuously connected to each other through a curved portion 630. Specifically, the spring bearing member 600 in the second embodiment can be obtained by press working of a donut-shaped disk member.

The axial bearing portion 610 has an x-axis positive direction surface 611 making in contact with the disk spring 500, whereas the radial bearing portion 620 has an inner peripheral surface 622 having a diameter larger than the outer diameter of the disk spring 500 so as not to reverse the relationship therebetween even if the outer diameter of the disk spring 500 increases due to elastic deformation caused by pressing.

Moreover, the disk spring 500 in the second embodiment includes an angle disk spring having a protrusion (bend) 530 curved over the whole circumstance in the x-axis negative direction at a position exterior of substantially the center between an inner peripheral end and an outer peripheral end. The disk spring 500 comprises an inner-periphery-side first spring portion 510 and an outer-periphery-side second spring portion 520 which extend from the protrusion 530 and have an inclination in the x-axis positive direction.

Therefore, when not pressed by the third piston 30, the disk spring 500 makes contact with the axial bearing portion 610 at the protrusion 530 only, and does not make contact with the curved portion 630 at a corner 521 which is an outer peripheral end and an x-axis negative direction end of the disk spring 500.

Next, operation of the disk spring 500 when pressed by the third piston 30 in the second embodiment will be described. When pressed by the third piston 30, the disk spring 500 makes contact with the axial bearing portion 610 of the spring bearing member 600 at the protrusion 530, so that a pressing force of the third piston 30 is transmitted to the spring bearing member 600.

Then, a pressing force of the third piston 30 is transmitted to the spring bearing member 600 with the protrusion 530 as a fulcrum. Also the disk spring 500 does not make contact with the spring bearing member 600 at the curved portion 630. Thus, even if the disk spring 500 becomes elastically deformed by pressing, the fulcrum of a pressing force is situated on the protrusion 530, i.e. it is fixed with respect to the x axis. As a result, since the fulcrum of a pressing force does not move with respect to the x axis even upon pressing of the third piston 30, the amount of stroke of the disk spring 500 does not vary by a factor other than elastic deformation.

The inner peripheral surface 622 of the radial bearing portion 620 has a diameter larger than the outer diameter of the disk spring 500. Since the relationship between the two is not reversed by a deformation amount due to elastic deformation, a stroke of the disk spring 500 may not be obstructed. Moreover, even if the disk spring 500 makes contact with the inner peripheral surface 622 by rotation of the members, the disk spring 500 does not make contact with the first drum 10 due to the existence of the radial bearing portion 620.

An effect of the second embodiment will be described. In the second embodiment, the spring bearing member 600 which is a member separate and distinct from the first driven plate 110' comprises axial bearing portion 610 substantially parallel to the first driven plate 110', and a radial bearing portion 620 arranged substantially perpendicular to the driven plates 100 and interposed between the disk spring 500 and the first drum 10. The axial bearing portion 610 and the radial bearing portion 620 are continuously connected to each other through the curved portion 630. Moreover, the disk spring 500 includes an angle disk spring having the protrusion (bend) 530 curved over the whole circumstance in the x-axis negative direction at a position exterior of substantially the center between the inner peripheral end and the outer peripheral end. The disk spring 500 comprises inner-periphery-side first spring portion 510 and outer-periphery-side second spring portion 520 which have an inclination in the x-axis positive direction.

With this, a pressing force of the third piston 30 is transmitted to the spring bearing member 600 with the protrusion 530 as a fulcrum. Thus, even if the disk spring 500 becomes elastically deformed by pressing, the fulcrum of a pressing force is situated on the axial bearing portion 610 which makes contact with the protrusion 530, i.e. it is fixed with respect to the x axis. This allows the disk spring 500 not to make contact with the curved portion 630 of the spring bearing portion 600 even when deformed elastically by pressing, resulting in achievement of a stable stroke of the disk spring 500 while avoiding contact wear of the disk spring 500 and the spring bearing member 600. Moreover, the spring bearing member 600 is a member separate and distinct from the first driven plate 110', allowing achievement of an effect without making a substantial change to the structure of the related-art clutch mechanism.

Further, since the axial bearing portion 610 and radial bearing portion 620 of the spring bearing member 600 are continuously connected to each other through the curved portion 630, the spring bearing member 600 can be obtained by press working of a donut-shaped disk member, resulting in a reduction in manufacturing cost.

Furthermore, contact can be avoided between the disk spring 500 and the first drum 10 through the radial bearing portion 620 of the spring bearing member 600, resulting in prevention of wear of the two.

Having described the present invention in connection with the preferred embodiments, it is noted that the present invention is not limited thereto, and various changes and modifications can be made without departing from the scope of the present invention.

In the first embodiment, the recess 430 is provided at a corner where the inner peripheral surface 422 of the radial bearing portion 420 of the spring bearing member 400 integrated with the first driven plate 110 meets the x-axis positive direction surface 411 of the axial bearing portion 410, avoiding contact between the corner 310 of the disk spring 300 and the spring bearing member 400. In the second embodiment, the axial bearing portion 610 and radial bearing portion 620 of the spring bearing member 600 which is a member separate and distinct from the first driven plate 110' are continuously connected to each other through the curved portion 630, and the disk spring 500 includes an angle disk spring, avoiding contact between the disk spring 500 and the curved portion 630 of the spring bearing member 600. Alternatively, other structure may be adopted on condition that the fulcrum of a pressing force of the piston is fixed with respect to the axial and radial directions while avoiding contact wear of the drum and the disk spring.

Figure 7:
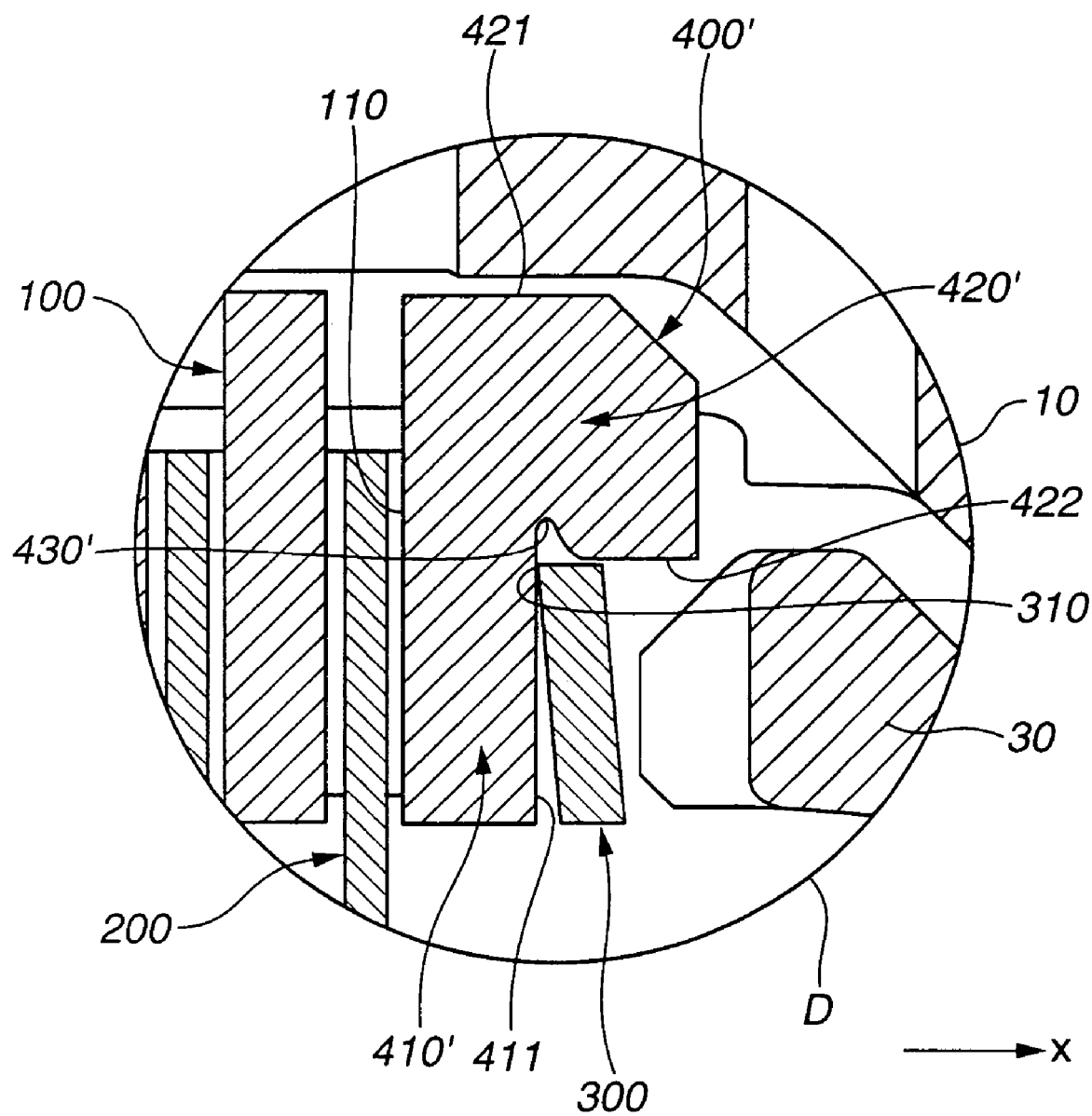
FIG. 7 is a view similar to FIG. 6, showing a variation of the frictional engagement structure.

In a variation, for example, referring to FIG. 7, a recess 430' denting in the radial direction is provided at a corner between the axial bearing portion 410' and radial bearing portion 420' of a spring bearing member 400'. Upon pressing of the piston, an x-axis negative direction end 310 of the outer periphery of a disk spring 300 enters the recess 430'. In this variation as well, the fulcrum of a pressing force of the piston is situated at the x-axis negative direction end 310 of the disk spring 300, and does not move with respect to the x axis, producing no fluctuation of a stroke of the disk spring 3000 by pressing.

Moreover, in the first embodiment, without providing the recess 430 to the spring bearing member 400, contact may be avoided between the corner of the spring bearing member 400 and the disk spring by using the disk spring 500 in the second embodiment.

The entire teachings of Japanese Patent Application 2004-171611 filed Jun. 9, 2004 are hereby incorporated by reference.

What is claimed is:

1. A frictional engagement structure using multiple disks, the frictional engagement structure being adapted to an automatic transmission including a casing, the frictional engagement structure comprising:
   a first drum arranged at an inner periphery of the casing;
   a second drum arranged at an inner periphery of the first drum;
   a plurality of first friction plates splined to one of the casing and the first drum;
   a plurality of second friction plates splined to the second drum,
   the first and second friction plates being arranged alternately in a direction of an axis of rotation of the first and second drums;

a piston that presses the first friction plates through a disk spring, the piston ensuring coupling between the first friction plates and the second friction plates to frictionally engage the one of the casing and the first drum with the second drum; and a spring bearing member arranged between the first friction plates and the disk spring, the spring bearing member comprising a plate portion substantially parallel to the first friction plates and an outer peripheral portion arranged substantially perpendicular to the first friction plates and interposed between the disk spring and one of the first drum and the casing, wherein the outer peripheral portion has an inner peripheral surface receiving the disk spring, and wherein the spring bearing member is formed with a recess at a corner where the inner peripheral surface of the outer peripheral portion meets a flat surface of the plate portion opposite to the piston.

2. The frictional engagement structure as claimed in claim 1, wherein the outer peripheral portion has an outer peripheral surface splined to the one of the first drum and the casing.

3. The frictional engagement structure as claimed in claim 1, wherein the spring bearing member is integrated with one of the first friction plates which is arranged closest to the piston.

4. The frictional engagement structure as claimed in claim 1, wherein the spring bearing member includes a member separated and distinct from one of the first friction plates which is arranged closest to the piston.

5. The frictional engagement structure as claimed in claim 1, wherein the recess extends in an axial direction of the frictional engagement structure.

6. The frictional engagement structure as claimed in claim 1, wherein the recess extends in a radial direction of the frictional engagement structure.

7. A frictional engagement structure using multiple disks, the frictional engagement structure being adapted to an automatic transmission including a casing, the frictional engagement structure comprising:
   a first drum arranged at an inner periphery of the casing;
   a second drum arranged at an inner periphery of the first drum;
   a plurality of first friction plates splined to one of the casing and the first drum;
   a plurality of second friction plates splined to the second drum;
   the first and second friction plates being arranged alternately in a direction of an axis of rotation of the first and second drums;
   a piston that presses the first friction plates through a disk spring, the piston ensuring coupling between the first friction plates and the second friction plates to frictionally engage the one of the casing and the first drum with the second drum; and
   a spring bearing member arranged between the first friction plates and the disk spring, the spring bearing member comprising a plate portion substantially parallel to the first friction plates and an outer peripheral portion arranged substantially perpendicular to the first friction plates and interposed between the disk spring and one of the first drum and the casing,
   wherein the spring bearing member is formed with a curved portion continuously connecting the plate portion and the outer peripheral portion, and the disk spring includes a bend curved over a whole circumference between an inner peripheral end and an outer peripheral end wherein the disk spring makes contact with the plate portion at the bend.

8. An automatic transmission, comprising:
   a casing;
   a first drum arranged at an inner periphery of the casing;
   a second drum arranged at an inner periphery of the first drum;
   a plurality of first friction plates splined to one of the casing and the first drum;
   a plurality of second friction plates splined to the second drum,
   the first and second friction plates being arranged alternately in a direction of an axis of rotation of the first and second drums;
   a piston that presses the first friction plates through a disk spring, the piston ensuring coupling between the first friction plates and the second friction plates to frictionally engage one of the casing and the first drum with the second drum; and
   a spring bearing member arranged between the first friction plates and the disk spring, the spring bearing member comprising a plate portion substantially parallel to the first friction plates and an outer peripheral portion arranged substantially perpendicular to the first friction plates and interposed between the disk spring and one of the first drum and the casing,
   wherein the outer peripheral portion has an inner peripheral surface receiving the disk spring, and
   wherein the spring bearing member is formed with a recess at a corner where the inner peripheral surface of the outer peripheral portion meets a flat surface of the plate portion opposite to the piston.

9. The automatic transmission as claimed in claim 8, wherein the outer peripheral portion has an outer peripheral surface splined to the one of the first drum and the casing.

10. The automatic transmission as claimed in claim 8, wherein the spring bearing member is integrated with one of the first friction plates, which is arranged closest to the piston.

11. The automatic transmission as claimed in claim 8, wherein the spring bearing member includes a member separated and distinct from one of the first friction plates, which is arranged closest to the piston.

12. The automatic transmission as claimed in claim 8, wherein the recess extends in an axial direction of the first and second friction plates.

13. The automatic transmission as claimed in claim 8 wherein the recess extends in a radial direction of the first and second friction plates.

14. An automatic transmission, comprising:
   a casing;
   a first drum arranged at an inner periphery of the casing;
   a second drum arranged at an inner periphery of the first drum;
   a plurality of first friction plates splined to one of the casing and the first drum;
   a plurality of second friction plates splined to the second drum;
   the first and second friction plates being arranged alternately in a direction of an axis of rotation of the first and second drums;
   a piston that presses the first friction plates through a disk spring, the piston ensuring coupling between the first friction plates and the second friction plates to frictionally engage one of the casing and the first drum with the second drum; and a spring bearing member arranged between the first friction plates and the disk spring, the spring bearing member comprising a plate portion substantially parallel to the first friction plates and an outer peripheral portion arranged substantially perpendicular to the first friction plates and interposed between the disk spring and one of the first drum and the casing, wherein the spring bearing member is formed with a curved portion continuously connecting the plate portion and the outer peripheral portion, and the disk spring includes a bend curved over a whole circumference between an inner peripheral end and an outer peripheral end wherein the disk spring makes contact with the plate portion at the bend.

15. A frictional engagement structure using multiple disks, the frictional engagement structure being adapted to an automatic transmission including a casing, the frictional engagement structure comprising:

a first drum arranged at an inner periphery of the casing;

a second drum arranged at an inner periphery of the first drum;

a plurality of first friction plates splined to one of the casing and the first drum;

a plurality of second friction plates splined to the second drum, the first and second friction plates being arranged alternately in a direction of an axis of rotation of the first and second drums;

means for pressing the first friction plates through a disk spring, the pressing means ensuring coupling between the first friction plates and the second friction plates to frictionally engage one of the casing and the first drum with the second drum; and a spring bearing member arranged between the first friction plates and the disk spring, the spring bearing member comprising a plate portion substantially parallel to the first friction plates and an outer peripheral portion arranged substantially perpendicular to the first friction plates and interposed between the disk spring and one of the first drum and the casing, wherein the outer peripheral portion has an inner peripheral surface receiving the disk spring, and wherein the spring bearing member is formed with a recess at a corner where the inner peripheral surface of the outer peripheral portion meets a flat surface of the plate portion opposite to the pressing means.

* * * * *